Dec. 22, 1936.　　　C. CHRISTIANSEN　　　2,065,171
LOAD LIFTING, CARRYING, AND DUMPING MACHINE
Filed Dec. 27, 1935　　　4 Sheets-Sheet 1
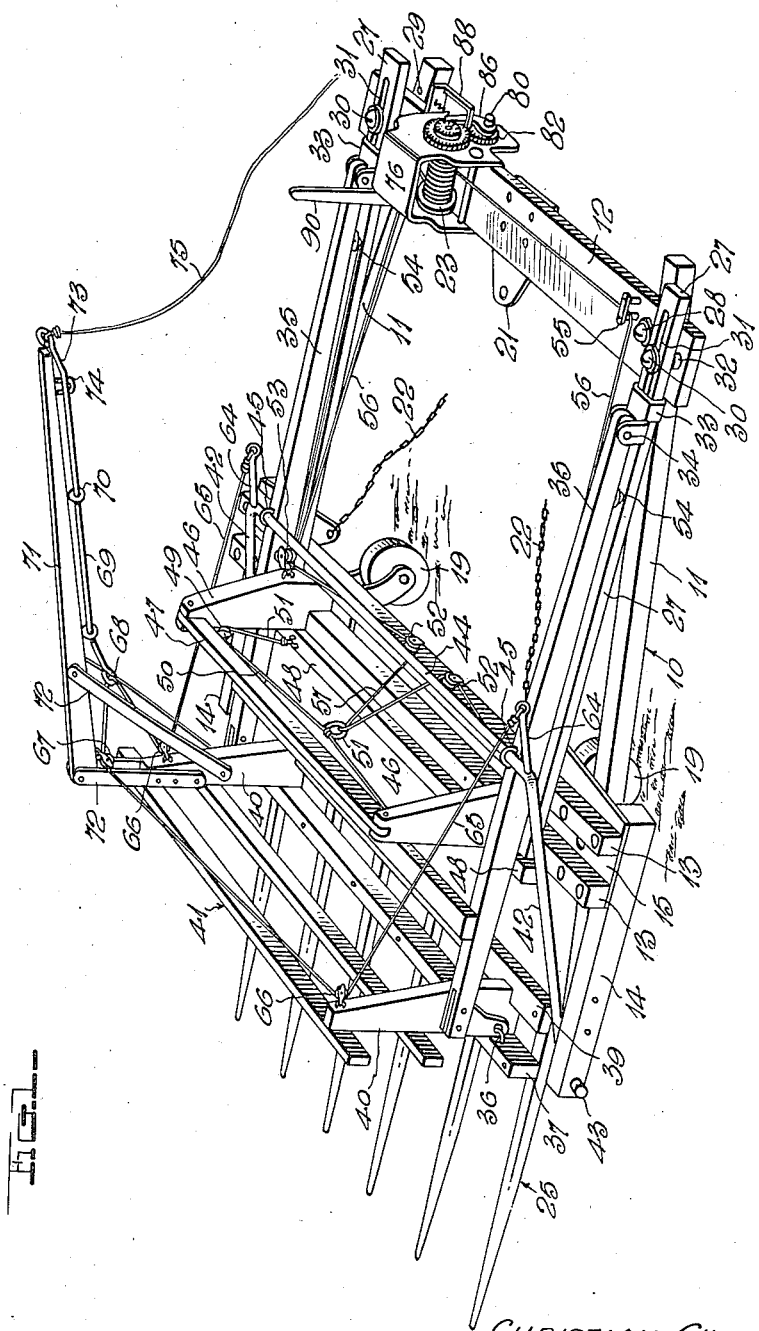
Inventor
CHRISTIAN CHRISTIANSEN
By H. Q. Willson & Co
Attorneys Dec. 22, 1936.  C. CHRISTIANSEN  2,065,171
LOAD LIFTING, CARRYING, AND DUMPING MACHINE
Filed Dec. 27, 1935   4 Sheets-Sheet 2
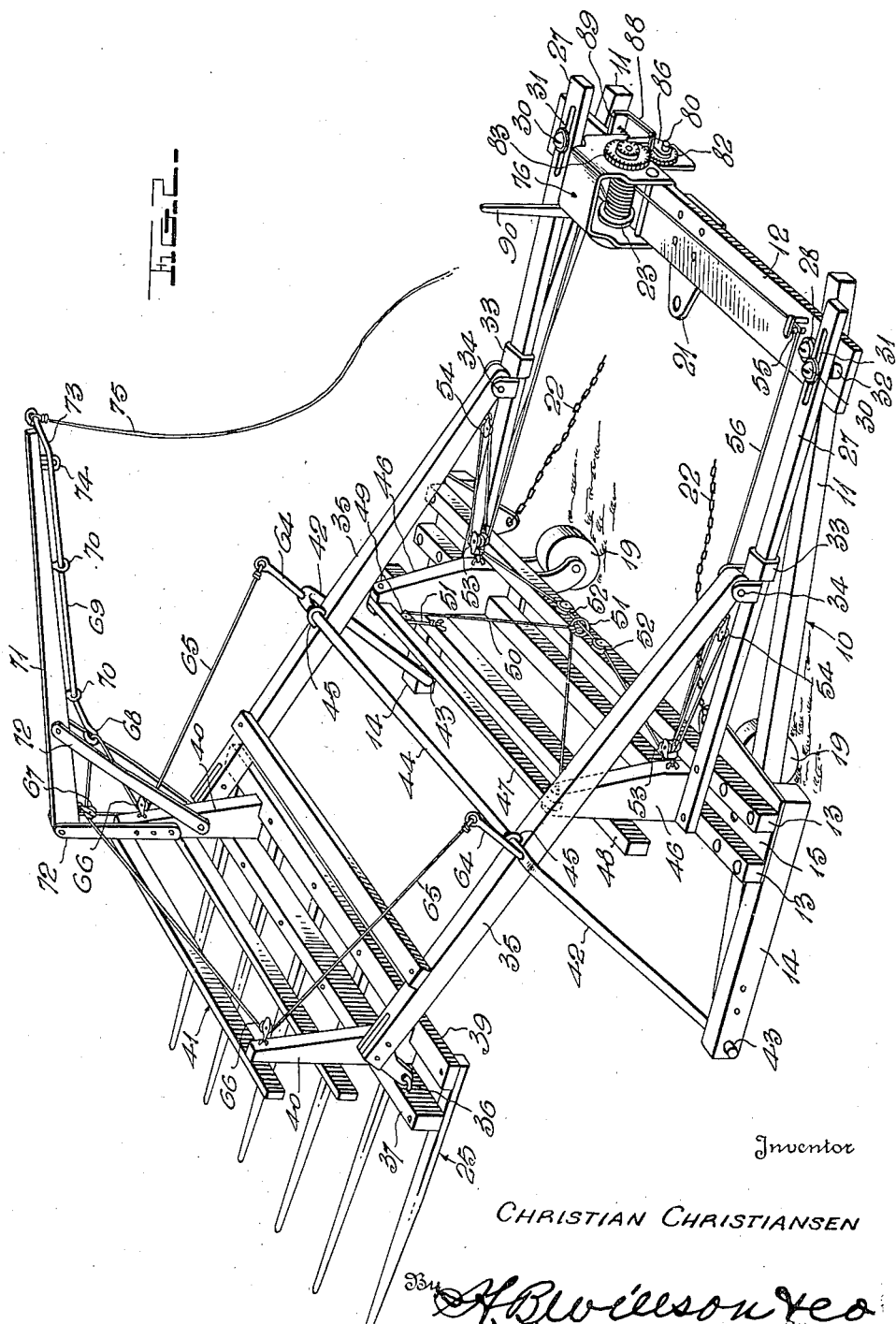
Inventor
CHRISTIAN CHRISTIANSEN
By H. B. Willson & co
Attorneys Dec. 22, 1936.  C. CHRISTIANSEN  2,065,171
LOAD LIFTING, CARRYING, AND DUMPING MACHINE
Filed Dec. 27, 1935  4 Sheets-Sheet 3
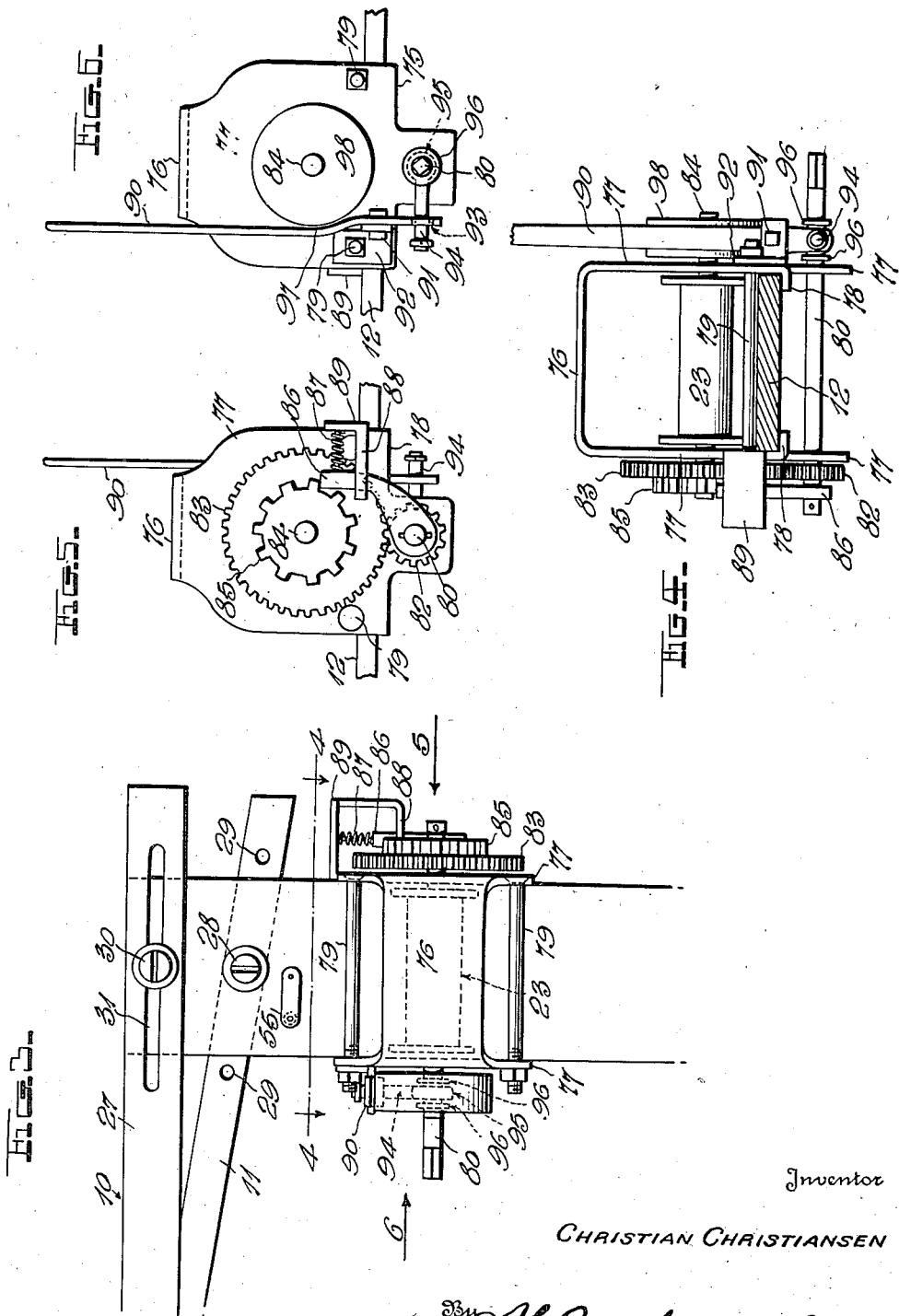
Inventor
CHRISTIAN CHRISTIANSEN

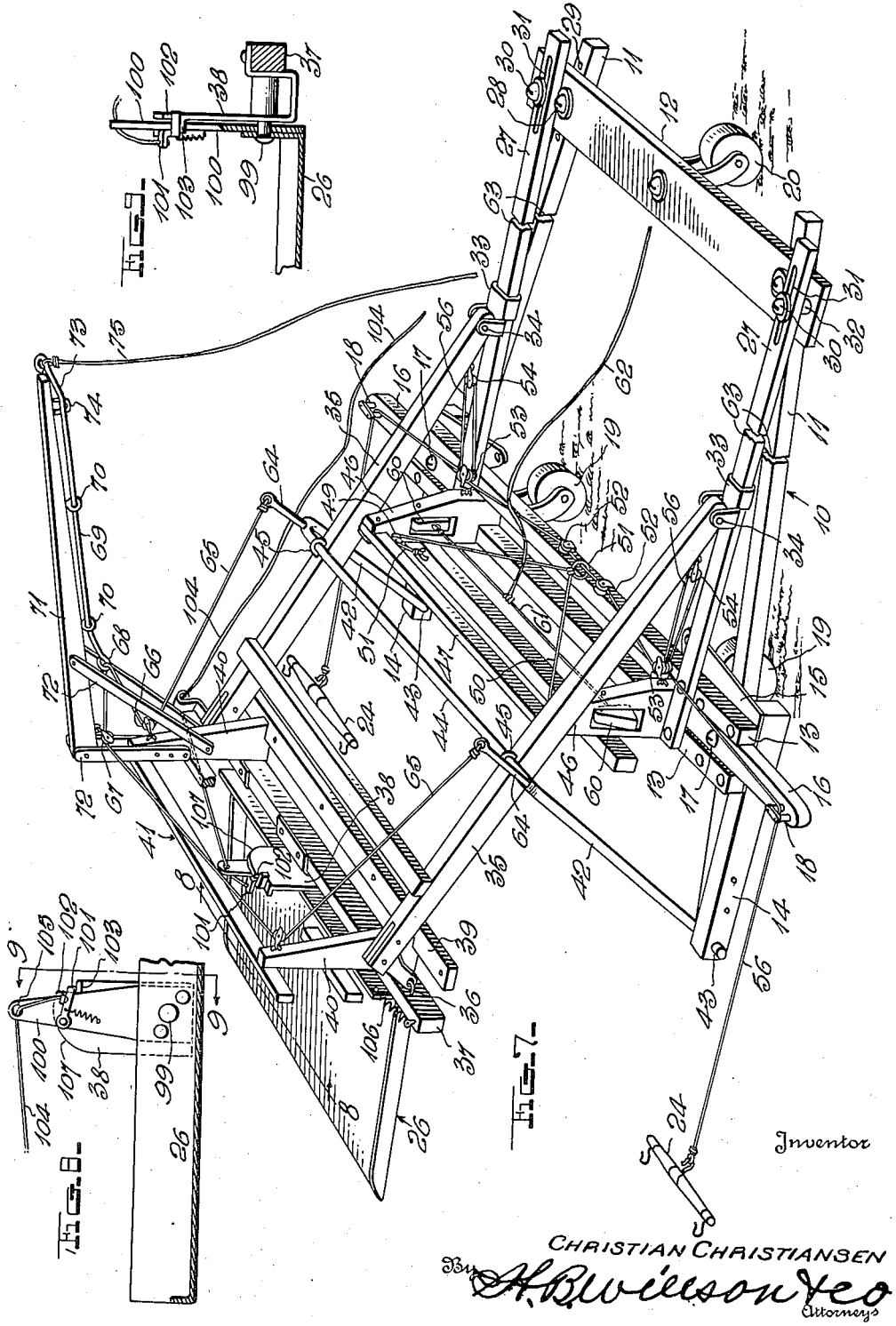

Patented Dec. 22, 1936

2,065,171

UNITED STATES PATENT OFFICE 2,065,171

LOAD LIFTING, CARRYING, AND DUMPING MACHINE

Christian Christiansen, Fargo, N. Dak.

Application December 27, 1935, Serial No. 56,379

12 Claims. (Cl. 214—113)

The invention relates to a machine for engaging and lifting a load, carrying said load to a desired point and discharging it for loading or stacking purposes, and the machine may be provided with a fork for handling hay or the like or with a scoop for beets, potatoes, corn, etc.

One object of the invention is to provide the machine in the form of an attachment conveniently applicable to and actuated by a tractor, although I provide also a form of construction which may be drawn and operated by horses or other draught animals.

Another object is to provide novel means for initially lifting the load with ease and for then rapidly and easily completing the lifting movement thereof, the load-supporting fork or scoop being moved well forward during such lifting, for expeditious dumping of the load clear of the machine.

Another object, in the tractor attachment form of the invention, is to make novel provision for adjusting parts as may be required, according to the particular tractor used.

A still further aim is to provide unique means for driving, braking and holding a tractor-driven cable-winding drum used in elevating the load.

Yet another aim is to make novel provision for holding the fork and/or scoop against tilting to load-dumping position until required, and for then allowing such tilting.

With the foregoing and minor objects in view, the invention resides in the novel subject matter hereinafter described and claimed, description being accomplished by reference to the accompanying drawings.

Figure 1 is a perspective view showing the form of construction adapted for attachment to a tractor and illustrating it provided with a load-supporting fork, the fork and its lifting means being shown in normal lowered position.

Fig. 2 is a view similar to Fig. 1 but showing the fork partly lifted.

Fig. 3 is a fragmentary top plan view of the structure shown at the upper right hand corner of Figs. 1 and 2.

Fig. 4 is a vertical longitudinal sectional view on line 4—4 of Fig. 3.

Figs. 5 and 6 are elevations looking in the directions indicated by the arrows 5—5 and 6—6 of Fig. 3.

Fig. 7 is a view similar to Fig. 2 but illustrating the form of construction adapted to be drawn and operated by horses or other draught animals, and illustrating also a tiltable scoop instead of a fork.

Fig. 8 is a vertical transverse sectional view on line 8—8 of Fig. 7.

Fig. 9 is a detail vertical longitudinal section on line 9—9 of Fig. 8.

The features of construction disclosed by the drawings will be rather specifically described, with the understanding however, that within the scope of the invention as claimed, variations may be made.

A mobile base frame 10 is provided which may be tractor operated (Figs. 1 to 4) or drawn by horses or other draught animals (Fig. 7). In the construction disclosed, the frame 10 includes longitudinal side bars 11 which preferably diverge forwardly, a rear end bar 12 connected to the rear ends of said side bars, and two transverse bars 13 secured to said side bars near the front ends thereof. The bars 13 are shown projecting laterally beyond the side bars 11 and secured upon short auxiliary side bars 14, the front ends of said side bars 11 being acutely beveled and secured to the inner sides of said bars 14. Horizontal plates 15 may be interposed between the transverse bars 13 and the side bars 11 and 14, all of these parts being securely fastened together by bolts or the like. When the machine is to be operated by horses or other draught animals (Fig. 7), lateral extensions 16 are placed upon the plates 15 between the bars 13 and secured in place by bolts or the like 17, the outer ends of these extensions being provided with sheaves, rollers or equivalent cable guides 18 for a purpose to appear. Whether the device is to be operated by horses or the like, or by means of a tractor, its front portion is supported by suitable casters 19 which are appropriately mounted under the transverse bars 13 or at other suitable locations. Another caster 20 is provided under the rear end bar 12 when the machine is to be operated by horses or the like as seen in Fig. 7, but when said machine is to be tractor actuated, said bar 12 is provided with suitable means 21 for engagement with a tractor hitch, the tractor occupying the space bounded by the bars 11, 12 and 13. The front portion of the frame is then connected with the front of the tractor by appropriate guiding chains or the like 22. For the tractor-actuated machine, a cable-winding drum 23 is mounted on the rear end bar 12 but on the horse-operated machine, I dispense with this drum and use suitable trees 24. The drum 23 or trees 24, actuate certain block-and-tackle mechanism in a manner which will hereinafter be clear, to lift the load. This load may be supported by a fork 25 (Figs. 1 and 2) or by a scoop 26 (Figs. 7, 8 and 9). The means for elevating the fork or the scoop is the same in both machines with minor exceptions which will be explained, and will now be described.

The mobile base frame 10 is provided with longitudinal trackage which preferably consists of two parallel tracks 27 whose front ends are secured upon the transverse bars 13, the rear ends of these tracks being secured to the ends of the rear end bar 12. In passing, it may be explained that the bar 12 is adjustable forwardly and rearwardly upon the side bars 11 in adapting the frame to a tractor, bolts 28 and bolt holes 29 (Fig. 3) being provided for this purpose. When such adjusting means are provided, it is also necessary to adjustably connect the rear ends of the tracks 27 with the end bar 12. Bolts 30 and slots 31 have been shown for this purpose, and these bolts are provided with appropriate spacers 32 which suitably space the rear ends of the tracks 27 above the ends of the bar 12.

Slides 33 are mounted on the tracks 27 for movement along the same, said slides being pivoted at 34 to laterally spaced, longitudinally extending, vertically swingable arms 35. These arms normally overlie the tracks 27 as seen in Fig. 1 and extend forwardly beyond said tracks, the front ends of said arms 35 being pivotally connected at 36 with a transverse bar 37 to which the teeth of the fork 25, or a bracket 38 carrying the scoop 26, may be secured. When the fork 25 is employed, the teeth thereof are also secured to another bar 39 parallel with the bar 37, and two upwardly projecting members 40 forming parts of the back stop 41 are secured to said bars 39 and 40 and project upwardly therefrom, the means for normally holding the fork 25 or scoop 26 against forward tilting, being connected with these members 40 as hereinafter described.

Two additional laterally spaced, longitudinally extending, vertically swingable arms 42 are pivoted at their front ends to the auxiliary side bars 14, as shown at 43, and the rear ends of said arms 42 are pivoted to the arms 35, at points between the ends of the latter. In the present disclosure, the rear ends of the arms 42 are connected by a transverse shaft 44 which passes through appropriate bearings 45 secured to the arms 35.

A frame structure rises rigidly from the transverse bars 13 of the frame 10 and preferably consists of two posts 46 having their upper ends connected by a crown bar 47, and a lifting bar 48 lies slidably against the front of said frame structure, the ends of said bar 48 extending under the front portions of the arms 35. By means of block-and-tackle mechanism operated either by the drum 23 or the trees 24, the bar 48 is first lifted to initially angle the arms 35 and 42 and initially lift the load, and said block-and-tackle mechanism then pulls forwardly upon the rear ends of said arms 35, causing the arms 42 to swing upwardly and forwardly to lift the load as seen in Fig. 2, and at the same time shifting the load well forwardly so that when it is dumped, it will be entirely clear of the machine.

The block-and-tackle mechanism above referred to will now be described. Two sheaves or the like 49 are mounted on the transverse bar 47, and a cable 50 extends between these sheaves, the ends 51 of said cable extending downwardly from said sheaves and being connected with the lifting bar 48. The reach of the cable 50 extending between the sheaves 49 is normally substantially straight as seen in Fig. 1 so that when said reach is pulled to the position seen in Fig. 2 or Fig. 7, the bar 48 is lifted to initially angle the arms 35 and 42 and initially lift the load. The center of this cable reach is provided with a ring or sheave 51, below which (on one of the bars 13) two sheaves or the like 52 are mounted. Other sheaves 53 are mounted on or near the lower ends of the posts 46, still others 54 are connected with the rear ends of the arms 35, and in the tractor-actuated construction (Figs. 1 and 2) additional sheaves 55 are provided on the rear bar 12. In this form of construction, a cable 56 is engaged with the various sheaves and has its ends connected with the drum 23 to be wound thereby when the drum is rotated, said cable 56 having a normally slack inverted V-shaped reach 57 which extends upwardly from the sheaves or the like 52 and passes through the ring 51. From these sheaves 52, the cable passes around the sheaves 53, then rearwardly around the sheaves 54, again forwardly around the sheaves 53, and in the tractor-actuated construction, extends again rearwardly from said sheaves 53 around the sheaves 55 and to the drum 23. In the horse-operated machine (Fig. 7), the cable 56, after passing around the sheaves 54 and forwardly around the sheaves 53, is engaged with the sheaves, rollers or the like 18 on the extension 16 and connected with the trees 24.

When the cable 56 is tightened, by driving the drum 23, or by driving the draught animals (hitched to the trees 24) laterally in opposite directions from the machine, the cable reach 57 is first tightened with the result that it pulls downwardly upon the reach of the cable 50 extending between the sheaves 49. The ends 51 of this cable are thus operated to raise the lifting bar 48 which initially angles the arms 35 and 42 relatively. After the slack has been removed from the cable reach 57, or in other words, when said reach extends straight between the sheaves 52 as seen in Figs. 2 and 7, the pull on the ends of the cable 56 causes the block-and-tackle mechanism to pull the arms 35 forwardly along the tracks 27, so that the parts move from the position shown in Fig. 1 to that shown in Figs. 2 and 7. When the pull on the cable 56 is released, (by freeing the drum 23 or by backing or driving the draught animals toward the machine) the parts return to normal by gravity.

In the horse-drawn form of construction, the horses pull the machine forwardly to engage it with the load and pull the loading machine to the desired point at which the load is to be dumped. To prevent the pull on the ends of the cable 56 from lifting the fork or the like as or before it is engaged with the load, suitable means may be provided. For this purpose, I have shown in Fig. 7, pivoted latches 60 which overlie the arms 35 when the latter are lowered, said latches being connected by a transverse rope 61 to which a latch-releasing rope 62 is attached. After the fork or the like has been engaged with the load by causing the draught animals to forwardly pull the machine, the latches 60 are released and the animals are driven laterally in opposite directions from the machine, causing lifting of the load as will be clear from Fig. 7. The animals are then again driven forwardly to pull the loaded machine to the desired point at which the load is to be dumped.

In the tractor-actuated construction, it is desirable that the machine be forwardly over-balanced so as to tilt about the casters 19, allowing the tractor to be run under the rear bar 12 when connecting it with the frame and disconnecting it therefrom. No such forward overbalancing is required or desired however, in the horse-drawn machine and to prevent it, I may either provide a much longer frame structure extending considerably further behind the casters 19, may weight the rear end of the frame, or both. I have shown breaks 63 in the side bars 11 and tracks 27 in Fig. 7, indicating a frame much longer than actually shown.

In holding the fork 25 or scoop 26 against forward tilting until desired, I provide novel means. The arms 42 are provided with extensions 64 to which the ends of a cable 65 are secured. This cable passes around sheaves 66 on the upwardly projecting members 40 and passes also around another sheave 67 above one of said sheaves 66. The reach of the cable 65 between the sheaves 67 and the subjacent sheaves 66, extends through an eye or the like 68 on the front end of a rod 69, said rod being slidable and rotatable in suitable bearings 70 carried by a rearwardly projecting arm 71 which is suitably secured by metal bars or the like 72, to one of the aforesaid members 40. The rear end of the rod 69 is provided with a lateral arm 73 to hook behind a lug 74 on the arm 71 as seen in Figs. 1, 2 and 7. When the rod 69 is so hooked, the eye 68 pulls the associated reach of the cable 65 into V-shape as shown in these views and thus holds the upper ends of the members 40 against forward movement and consequently prevents the fork 25 or scoop 26 from tilting and dumping the load. A releasing rope 75, however, is connected with the arm 73 and when this rope is pulled, said arm is freed from the lug 74 and the rod 69 may slide forwardly in the bearings 70, thereby so releasing the cable 65 as to allow tilting and dumping of the fork or scoop.

I preferably mount the drum 23 within an arched frame 76 whose leg portions 77 straddle the rear end bar 12 of the frame 10, said leg portions being provided with flanges 78 engaging the lower side of said end bar 12 and being connected by bolts 79 which lie upon said end bar. By loosening these bolts, the frame 76 may be adjusted along the bar 12 in adapting the device to the tractor, and by tightening said bolts, the frame is clamped in adjusted position.

A drive shaft 80 is supported by the legs 77 below the bar 12 and is squared or otherwise shaped at its front end to facilitate connection with the usual power take-off means of the tractor. The rear end portion of the drive shaft 80 carries a pinion 82 cooperable with a gear 83 on the shaft 84 of the drum 23, said pinion being movable into mesh with said gear by forwardly sliding the shaft 80 and being disengageable from said gear by rearwardly sliding said shaft 80. The shaft 84 carries a ratchet wheel 85 at the rear side of the gear 83, and a dog 86 is cooperable with said ratchet wheel to hold the drum 23 against retrograde rotation when the load has been raised and the driving of shaft 80 stopped. This dog 86 is mounted upon the shaft 80 and when this shaft is rearwardly slid to disengage the pinion 82 from the gear 83, the dog moves with said shaft, thereby freeing the ratchet wheel 85 and allowing the drum 23 to rotate during lowering of the fork, scoop or the like to normal position.

A spring 87 is shown for swinging the dog 86 into engagement with the teeth of the ratchet wheel 85 and for allowing it to click over said teeth, and to prevent said dog from moving excessively under the action of said spring when the dog is disengaged from the ratchet wheel 85, I have shown a stop finger 88 carried by a suitable bracket 89 which is appropriately secured to one of the legs 77 of the frame 76. The spring 87 engages this bracket as shown in Figs. 3 and 5 and said spring of course yields laterally from the position shown in Fig. 3 when the dog 86 is moved rearwardly out of engagement with the ratchet wheel 85. The finger 88 then prevents such swinging of the dog 86 as to interfere with re-engagement of said dog with the ratchet wheel 85, upon forward sliding of the shaft 80 to remesh pinion 82 with gear 83.

A hand lever 90 is fulcrumed at 91 to a bracket 92 which is pivotally carried by the frame 76, the fulcrum 91 being transverse to the shafts 80 and 84 and the pivotal axis being parallel with said shafts. The bracket 92 is shown as pivotally supported by one of the bolts 79. The lower end of the lever 90 is formed with an opening 93 which slidably receives a stub 94, said stub having a bearing 95 through which the rear portion of the shaft 80 passes, said shaft being provided with two fixed collars 96 at opposite sides of said bearing 95. When the lever 90 is swung about its fulcrum 91, it moves the stub 94 and bearing 95 to slide the drive shaft 80 for the purpose of moving the pinion 82 and dog 86 into and out of operative engagement with the gear 83 and ratchet wheel 85 respectively. This same lever 90 is provided with a brake portion 97 disposed at the periphery of a brake wheel 98 secured to the front end of the drum shaft 84, and by tilting said lever 90 about the pivot of the bracket 92, said brake portion may be brought into engagement with said brake wheel to control the retrograde rotation of the cable-winding drum 23 as the fork, scoop or the like is allowed to lower by gravity.

The scoop 26 is pivoted at 99 to the bracket 38 above described, permitting said scoop to be laterally tilted for dumping if desired, instead of tilting it forwardly by a pull upon the rope 75 above described. This scoop is provided with a rigidly attached upstanding arm 100 carrying a pivoted latch 101 which is engageable with a shoulder 102 on the bracket 38 to normally hold the scoop 26 against tilting in one direction, and said bracket is provided with a stop portion 103 normally abutting said arm 100 to hold the scoop against tilting in the other direction. A releasing rope or the like 104 is connected with the latch 101 for releasing it when pulled. This rope preferably passes through an opening 105 in the upper end of the arm 100 and exerts a pull on said arm end to laterally tilt the scoop 26 upon release of the latch 101. For returning the scoop to normal position, a spring 106 (Fig. 7) may be provided, and the bracket 38 is suitably shaped at 107 to guide the latch 101 again into engagement with the shoulder 102.

It will be seen from the foregoing that novel and advantageous provision has been made for carrying out the objects of the invention. While the general construction shown and described, may be followed if desired, numerous variations may be made within the scope of the invention as claimed.

I claim:—

1. A machine of the class described comprising a base having a longitudinal track; a load support; lifting means operatively connected with said load support and including a vertically swingable longitudinal arm slidably connected at its rear end with said track, and a second vertically swingable longitudinal arm having its front and rear ends pivoted to said base and the first mentioned arm respectively; means mounted on said base for lifting the pivotally connected portions of said arms to relatively angle said arms and initially lift said load support, and means for then forwardly pulling the rear end of said first mentioned arm along said track to further angle said arms and complete the lifting of said load support.

2. A machine of the class described comprising a base having a longitudinal track; a load support; lifting means operatively connected with said load support and including a vertically swingable longitudinal arm slidably connected at its rear end with said track, and a second vertically swingable longitudinal arm having its front and rear ends pivoted to said base and the first mentioned arm respectively; means mounted on said base for lifting said arms to relatively angle said arms and initially lift said load support, means for then forwardly pulling the rear end of said first mentioned arm along said track to further angle said arms and complete the lifting of said load support, and actuating means for said arm-lifting and arm-pulling means mounted on said base.

3. A machine of the class described comprising a base having a longitudinal track; a load support; lifting means operatively connected with said load support and including a vertically swingable longitudinal arm slidably connected at its rear end with said track, and a second vertically swingable longitudinal arm having its front and rear ends pivoted to said base and the first mentioned arm respectively; block-and-tackle mechanism operatively connected with said base and the rear end of said first mentioned arm for pulling said rear arm end along said track to relatively angle said arms and lift said load support, an upstanding member rigidly carried by said base near said arms, an arm-lifting device upon which one of said arms normally rests, and additional block-and-tackle mechanism operatively connected with said upstanding member and said arm-lifting device for initially lifting and relatively angling said arms, said additional block-and-tackle mechanism being operatively connected with and being actuated by a normally slack cable reach of the first mentioned block-and-tackle mechanism.

4. A machine of the class described comprising a base having a longitudinal track; a load support; lifting means operatively connected with said load support and including a vertically swingable longitudinal arm slidably connected at its rear end with said track, and a second vertically swingable longitudinal arm having its front and rear ends pivoted to said base and the first mentioned arm respectively; block-and-tackle mechanism operatively connected with said base and the rear end of said first mentioned arm for pulling said rear arm end along said track to relatively angle said arms and lift said load support, an upstanding member rigidly carried by said base near said arms, an arm-lifting device upon which one of said arms normally rests, additional block-and-tackle mechanism operatively connected with said upstanding member and said arm-lifting device for initially lifting and relatively angling said arms, said additional block-and-tackle mechanism being operatively connected with and being actuated by a normally slack cable reach of the first mentioned block-and-tackle mechanism, and a power actuated drum on said frame connected with said first mentioned block-and-tackle mechanism for operating the same.

5. A machine of the class described comprising a base having longitudinal trackage; a load support; lifting means operatively connected with said load support and including two laterally spaced vertically swingable longitudinal arms slidably connected at their rear ends with said trackage, and two additional laterally spaced vertically swingable longitudinal arms having their front and rear ends pivoted to said base and the first mentioned arms respectively; a rigid upstanding frame structure carried by said base between said first mentioned arms; two sheaves supported by the upper end of said frame structure; a cable having a reach extending between said sheaves, the ends of said cable being engaged with and depending from said sheaves; an arm-lifting bar underlying at least two of the aforesaid laterally spaced arms and connected with said cable ends, whereby pulling upon said cable reach will lift said bar to initially angle the arms relatively and initially lift the load; and block-and-tackle mechanism operatively connected with said cable reach, with said base, and with the rear ends of the first mentioned arms for first pulling upon said cable reach and then pulling said rear arm ends forwardly along said trackage.

6. A machine of the class described comprising a base having longitudinal trackage; a load support; lifting means operatively connected with said load support and including two laterally spaced vertically swingable longitudinal arms slidably connected at their rear ends with said trackage, and two additional laterally spaced vertically swingable longitudinal arms having their front and rear ends pivoted to said base and the first mentioned arms respectively; a rigid upstanding frame structure carried by said base between said first mentioned arms; two sheaves supported by the upper end of said frame structure; a cable having a reach extending between said sheaves, the ends of said cable being engaged with and depending from said sheaves; an arm-lifting bar underlying at least two of the aforesaid laterally spaced arms and connected with said cable ends, whereby pulling upon said cable reach will lift said bar to initially angle the arms relatively and initially lift the load; and block-and-tackle mechanism operatively connected with said base and with the rear ends of the first mentioned arms for pulling the latter forwardly along said trackage after said initial arm-angling and body-lifting, said block-and-tackle mechanism including an inverted V-shaped cable reach connected at its center to the center of the aforesaid cable reach and arranged to straighten and pull upon the latter to effect said initial arm-angling and load-lifting.

7. A machine of the class described comprising a base having longitudinal trackage; two longitudinal laterally spaced vertically swingable arms slidably connected at their rear ends with said trackage, the front ends of said arms being provided with load-supporting means; two additional longitudinal laterally spaced vertically swingable arms pivoted at their front ends to said base and having their rear ends pivoted to the first mentioned arms at points between the ends of the latter; and means for initially angling the first mentioned and additional arms and then sliding the rear ends of the former along said trackage to elevate the load.

8. A machine of the class described comprising a base having longitudinal trackage; two longitudinal laterally spaced vertically swingable arms slidably connected at their rear ends with said trackage, a load support pivoted to the front ends of said arms upon a transverse horizontal axis, said load support being provided with vertical rigidly attached members projecting upwardly beyond its pivotal axis; two additional longitudinal laterally spaced vertically swingable arms whose front ends are pivoted to said base, the rear ends of said additional arms being pivoted to the first mentioned arms at points between the ends of the latter, said rear ends of said additional arms being provided with rigid extensions which project above the first mentioned arms when both sets of arms are swung upwardly; a cable secured at its ends to said extensions, guides on said upwardly projecting members of said load support through which said cable passes; releasable means for so angling and holding a reach of said cable as to hold said load support against dumping until desired; and means for relatively angling the first mentioned and additional arms and sliding the rear ends of the former along said trackage to elevate the load.

9. A load lifter and carrier comprising a frame having side bars to extend alongside a tractor, a rear bar to extend behind the tractor, and means connecting said side and rear bars; means for connecting said frame with the tractor, load-lifting means mounted on said frame; and tractor-actuated operating means for said load-lifting means mounted on said rear bar, said tractor-actuated operating means being provided with releasable fastening means by means of which it is mounted on said rear bar, said fastening means being adjustable along said rear bar as required when connecting said tractor-actuated means with a conventional power take-off shaft of the tractor.

10. A load lifter and carrier comprising a frame having side bars to extend alongside a tractor, a rear bar to extend behind the tractor, and means connecting said side and rear bars; means for connecting said frame with the tractor, including a hitch connected to said rear bar; load-lifting means mounted on said frame; and tractor-actuated operating means for said load-lifting means mounted on said rear bar, said connecting means being constructed to enable forward and rearward adjustment of said rear bar as required when connecting the frame with the tractor, said tractor-actuated operating means being provided with releasable fastening means by means of which it is mounted on said rear bar, said fastening means being adjustable along said rear bar as required when connecting said tractor-actuated means with a conventional power take-off shaft of the tractor.

11. In a tractor-actuated load lifter and carrier, a frame having a rear transverse bar to extend behind the tractor, load-lifting means mounted on said frame, an actuating cable for said load-lifting means, a tractor-actuated winding drum for said cable, an arched frame carrying said drum and straddling said rear bar, the leg portions of said arched frame being provided with flanges engaging the lower side of said rear bar, and a clamping bolt engaging the upper side of said rear bar and connecting said leg portions for drawing them into clamping contact with said rear bar.

12. In a load lifter and carrier, a mobile frame having a vertically movable member at its front, a scoop in front of said member, means pivoting the rear end of said scoop to said member on an axis extending in a front-to-rear direction, an arm secured to and projecting upwardly from said scoop, a latch mounted on said arm, a bracket secured to said member behind said arm, said bracket having a stop abutting said arm to prevent tilting of said scoop in one direction, said bracket also having a portion cooperable with said latch to prevent tilting of said scoop in the other direction, and means connected with said latch for releasing the latter and then tilting said scoop in said other direction.

CHRISTIAN CHRISTIANSEN.